(12) United States Patent
Fuchs et al.

(10) Patent No.: US 7,354,473 B2
(45) Date of Patent: Apr. 8, 2008

(54) NBC-BUILDING PROTECTION SYSTEM AND METHOD

(75) Inventors: Karl-Hans Fuchs, Zikhron Yaaqov (IL); Albrecht Fuchs, Zikhron Yaaqov (IL); Samuel Koeger, Zikhron Yaakov (IL)

(73) Assignee: Beth-El Zikhron-Ya'Aqov Industries Ltd., Zikhron Yaaqov (IL)

( * ) Notice: Subject to any disclaimer, the term of this patent is extended or adjusted under 35 U.S.C. 154(b) by 979 days.

(21) Appl. No.: 10/648,242

(22) Filed: Aug. 27, 2003

(65) Prior Publication Data

US 2004/0144104 A1    Jul. 29, 2004

(30) Foreign Application Priority Data

Jan. 27, 2003   (IL) .................................... 154153

(51) Int. Cl.
*B01D 46/00* (2006.01)
*B01D 50/00* (2006.01)

(52) U.S. Cl. .............................. 95/273; 55/312; 55/315; 55/318; 55/327; 55/332; 55/385.2; 55/385.6; 55/486; 55/DIG. 34; 95/8; 96/136; 96/142; 96/417

(58) Field of Classification Search .................. 55/309, 55/312, 318, 320–323, 327, 332, 385.1, 385.2, 55/385.6, 482, 485–487, 488–489, DIG. 34; 95/8, 273, 285–287; 96/136, 139, 140, 142, 96/417
See application file for complete search history.

(56) References Cited

U.S. PATENT DOCUMENTS

| 5,042,997 | A | * | 8/1991 | Rhodes .......................... 96/18 |
| 5,053,064 | A | * | 10/1991 | Hama et al. ................... 96/111 |
| 5,665,143 | A | * | 9/1997 | Jarvis et al. ................... 95/96 |
| 6,099,617 | A | * | 8/2000 | Bennett ......................... 95/99 |
| 6,328,775 | B1 | * | 12/2001 | Fuchs ......................... 55/385.2 |
| 6,375,697 | B2 | * | 4/2002 | Davies ......................... 55/340 |
| 6,790,249 | B2 | * | 9/2004 | Davies ......................... 55/340 |
| 6,840,986 | B1 | * | 1/2005 | Koslow ........................ 96/135 |
| 7,048,776 | B2 | * | 5/2006 | Moore et al. ..................... 95/8 |
| 7,052,525 | B2 | * | 5/2006 | Kang et al. ................. 55/385.2 |
| 2003/0101700 | A1 | * | 6/2003 | Burdine et al. ............. 55/385.2 |
| 2004/0226310 | A1 | * | 11/2004 | Fuchs ........................... 62/317 |
| 2005/0011356 | A1 | * | 1/2005 | Laiti ........................... 95/273 |
| 2007/0101688 | A1 | * | 5/2007 | Wootton et al. ............ 55/385.2 |

* cited by examiner

*Primary Examiner*—Duane Smith
*Assistant Examiner*—Robert A Clemente
(74) *Attorney, Agent, or Firm*—Jacobson Holman PLLC

(57) ABSTRACT

A combined building air-conditioning unit and NBC protection system, containing an enclosed space housing a building air-conditioning unit and further including a plurality of chambers, a first chamber having an ambient air inlet port, one prefilter and a blower for sucking air through the prefilter, a second chamber having a valve including an open and closed state, receiving air from the blower and accommodating a C-detector and a valve actuator responsible, at least indirectly to, and operable by, the C-detector, and a third chamber housing at least one C-filter and a blower for sucking air from the second chamber via the C-filter into the building when the valve is in its closed state. A method for economically controlling air purity within a protected space is also provided.

23 Claims, 4 Drawing Sheets

NBC-BUILDING PROTECTION SYSTEM AND METHOD

FIELD OF THE INVENTION

The present invention relates to a nuclear, chemical or biological (NBC)-air filtering system for protection against hazardous materials contaminating the air, a space defined by wall surfaces constituting an essential part or parts of a building. More particularly, the invention relates to an NBC-air filtering system to be used in a building for preventing the penetration of contaminated air and/or gases, liquids or aerosols, by having means for triggering additional complete protection against hazardous chemicals. The invention further relates to a method for controlling air purity within such a protected space.

BACKGROUND OF THE INVENTION

As is known, there is an increasing need for protection against the penetration of contaminants into a sheltered space, given by the threat of military attacks and by acts of terror using NBC means of warfare. Such protection is provided by the use of shelters and protected spaces located inside buildings. Shelters are provided with professional NBC air filtering systems including blowers, which create an overpressure inside the protected space and provide cleaned and filtered air. The overpressure is important in order to ensure a clear direction of airflow from inside the protected space to the outside atmosphere, through ever-present vents in the walls of the shelter, the door or the window seals. Use of this method assures that no contaminated air will penetrate into the protected space.

Due to the potential of terror attacks, shelters can no longer provide the degree of required protection, but complete facilities or parts of buildings have to be pressurized using airtight windows and other required elements.

Furthermore, due to the terrible advancement in warfare and warfare agents, the need for use of a comprehensive protection system, especially the NBC-system, in a 24 hour/7 day mode, has risen, since in the event of a "silent terror attack", no alert is given and the threat is neither obvious to the population, nor to the experts. Therefore, entire buildings have to be protected and used at all times under conditions such as those under a terror attack. For such a use, the costs of the NBC-filter material and the energy to constantly operate the systems are very large. The need for a system and method that allow the achievement of reliable protection in the 24/7 mode with acceptable costs, is required.

DISCLOSURE OF THE INVENTION

It is therefore a broad object of the present invention to provide a system and a method for 24 hour/7 day collective protection of buildings or parts of buildings against NBC, in consideration of the degree of terror threats and attacks.

According to the invention, the above object is achieved by providing a combined building air-conditioning unit and NBC protection system, comprising an enclosed space housing a building air-conditioning unit and further including a plurality of chambers; a first chamber having an ambient air inlet port, at least one prefilter and a blower for sucking air through said prefilter; a second chamber having valve means having an open and closed state, receiving air from said blower and accommodating a C-detector and a valve means actuator, responsive, at least indirectly to, and operable by, said C-detector, and a third chamber housing at least one C-filter and a blower for sucking air from said second chamber via said C-filter into the building when said valve means is in its closed state.

The invention further provides a method for economically controlling air purity within a protected space, said method comprising providing a combined building air-conditioning unit and a NBC protection system having an enclosed space housing a building air-conditioning unit and further including a plurality of chambers; a first chamber having an ambient air inlet port, at least prefilter and a blower; a second chamber having valve means receiving air from said blower and accommodating a C-detector and a valve means actuator responsive to, and at least indirectly, operable by said C-detector, and a third chamber housing at least one C-filter and a blower; sucking ambient air into said first chamber by said blower and activating said C-detector, and causing the valve means of said second chamber to close and activate said C-filters and blowers upon detecting C-contamination by said C-detector.

The invention still further provides a method for economically controlling air purity within a protected space, said method comprising providing a combined building air-conditioning unit and a NBC protection system having an enclosed space housing a building air-conditioning unit and further including a plurality of chambers; a first chamber having an ambient air inlet port, at least prefilter and a blower; a second chamber having valve means receiving air from said blower and accommodating a C-detector and a valve means actuator responsive to, and at least indirectly, operable by said C-detector, and a third chamber housing at least one C-filter and a blower; sucking ambient air into said first chamber by said blower and activating said C-detector, and causing the valve means of said second chamber to close and activate said C-filters and blowers upon receiving a signal from an NBC attack warning station.

It is a feature of the invention that only a part of the entire protection system, i.e., the NBC-air filtering system, operate only during times where detection units provide an alert. The detection units can be a part of the system or can be located remotely while transmitting a signal to the combined protection system according to the invention. The advantage is that the main cost of the NBC system, namely, the costly collective protection filters, will last much longer, hence resulting in the saving of operation costs. Additionally, the substantial airflow resistance of these C-filters is not required to be covered by the blowers in non-alert times, providing great energy savings. The airflow resistance of the C-protection filters is several times higher than the airflow resistance of the conventional air-conditioning filtration system including B-protection (Biological protection) filters. The savings in energy can easily be 30-40% of the energy costs of the complete air-conditioning system. This figure is due to the fact that not only does the direct consumed energy have to be calculated, but additionally the indirect increased need for cooling of the air from the heat generated by the air flow against the airflow resistance of the C-filters, is saved.

It is an option of the invention to provide some activated carbon prefiltration (with a tiny C-protection level) included into the B-collection filter system. Such activated carbon prefilters have only a fraction of the pressure drop of the B-collection filters and are neglectable with respect to energy consumption and costs. The costs are small, since the carbon does not have to be specifically impregnated. These carbon prefilters can be replaced on a regular basis like other dust prefilters. The effect is double fold: firstly, the building is at all times protected from chemistry in air pollution; secondly, if the C-detector is located in the airflow path after the pre-carbon filtration, an alert is not sounded by each small amount of chemistry in the air, but only by a more real danger. The fact that C-sensors send false signals to some degree, is not a real problem, since as long as real threats are covered, it is only a small waste of energy during short periods of false alarms, as compared to the huge savings of energy during the majority of the time.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic representation of a building having a HVAC system according to the present invention, on its roof;

FIG. 2 is an isometric representation of an embodiment of a HVAC system with its ceiling removed, according to the present invention;

FIG. 3 is a top view of the system of FIG. 2;

FIG. 4 is a top view of the system of FIG. 2 with a slight modification illustrating modes of operation, and FIG. 5 is an isometric view of a further embodiment of a HVAC system, according to the present invention.

DETAILED DESCRIPTION OF THE PREFERRED EMBODIMENTS

Figure 1:
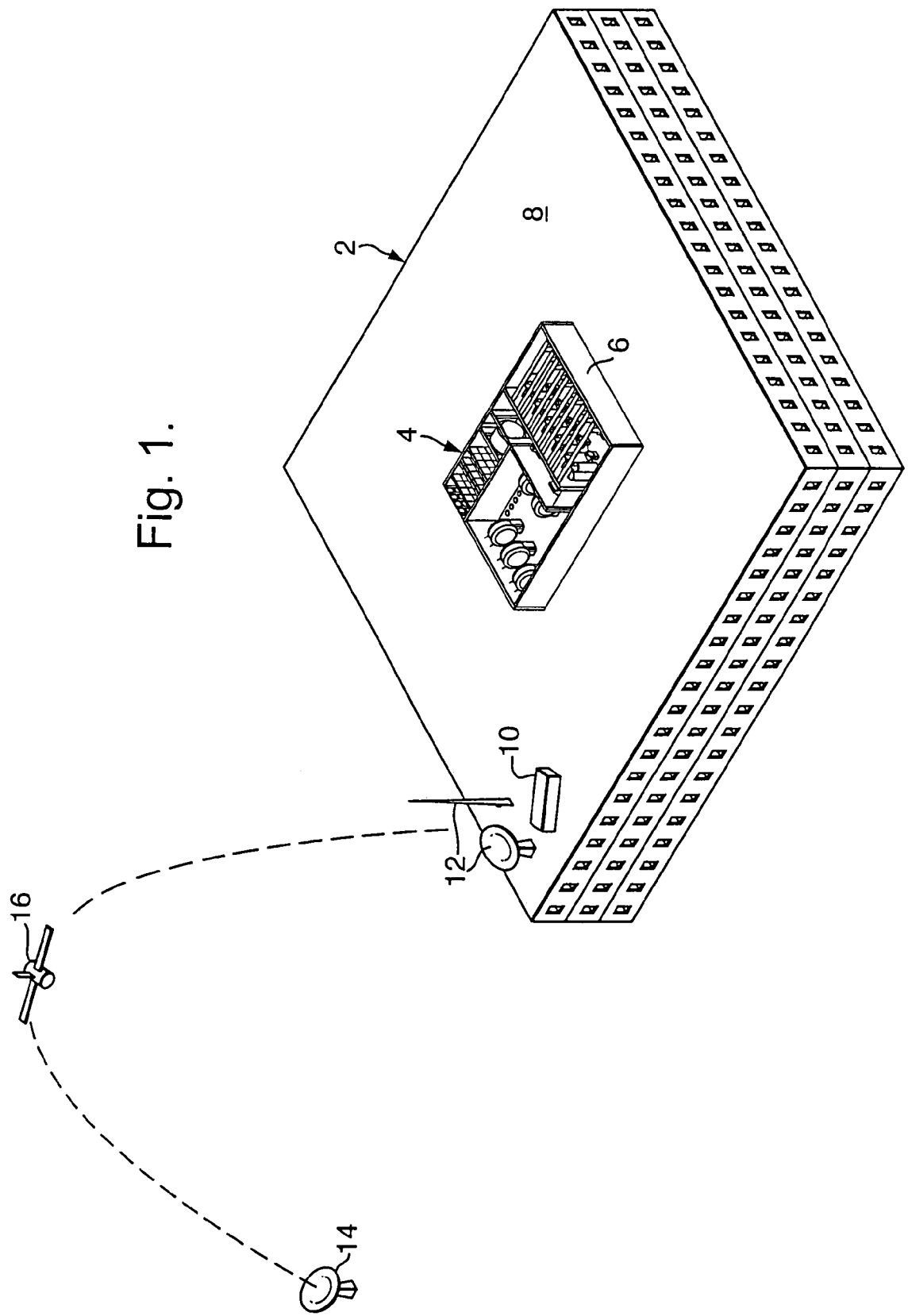

Referring now to the drawings, there is illustrated in FIG. 1 a schematic representation of a building 2, e.g., an office building, as shown by way of example, or merely a small residential building equipped with a system 4 according to the present invention, enclosed in a structure 6 and located on the roof 8 of the building. Such a building may also be provided with communication means, e.g., a transceiver 10 having antennas 12 for receiving computations pertaining to possible NBC attacks directly from a ground transmitter 14 or via a satellite 16, operationally connected to the system 4.

Figure 2:
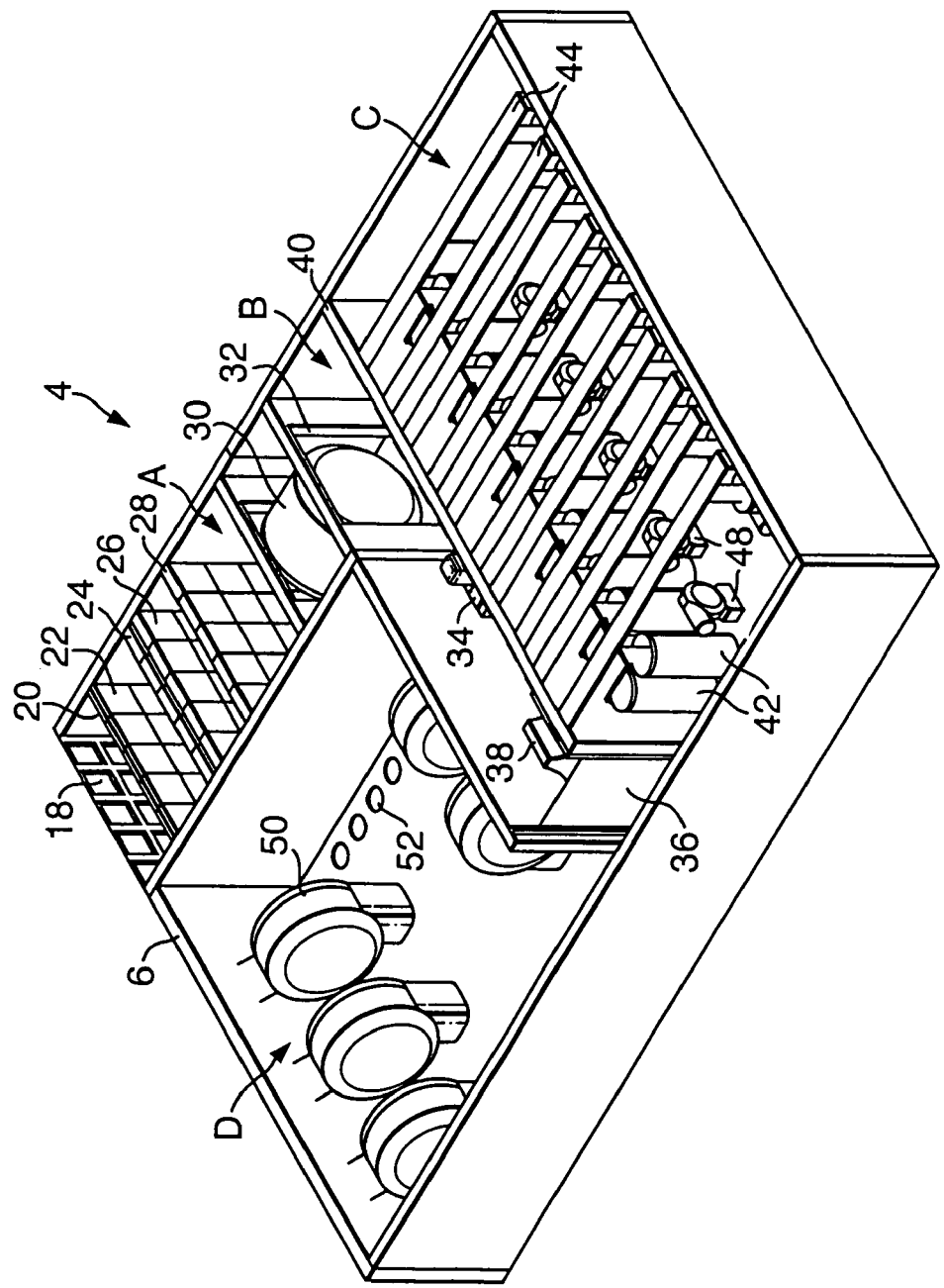
Figure 3:
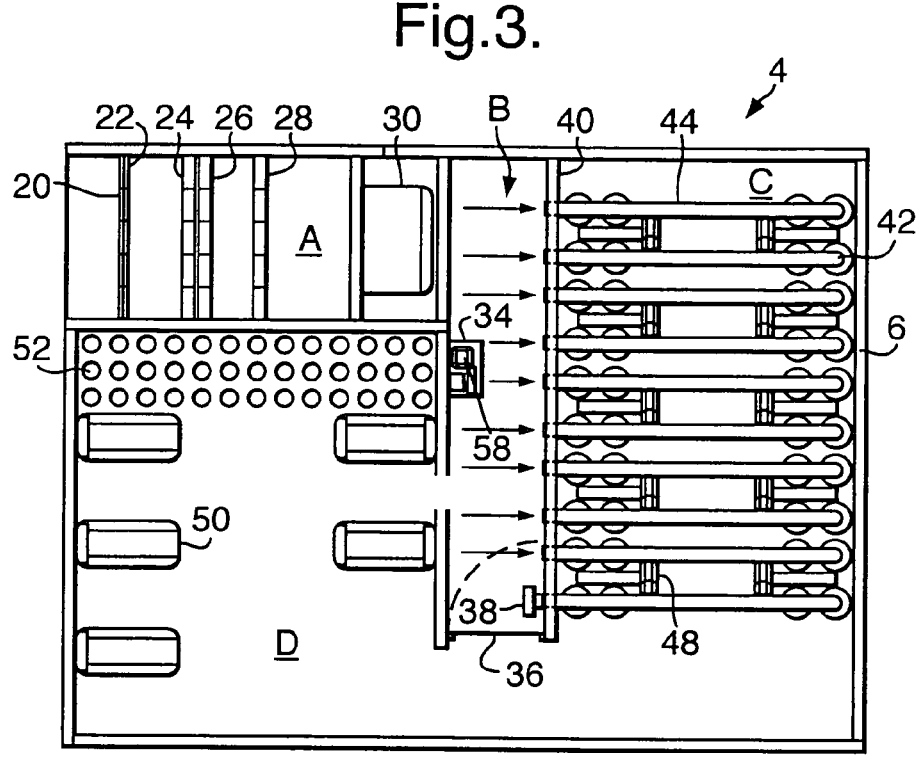

FIGS. 2 and 3 illustrate in isometric and top view, details of the system 4 and the arrangement of the various units of which the system is composed. Starting from the upper left corner of the structure 6, there are seen air inlet ports 18 for admitting air into a first chamber A, selectively housing a series of contacting and/or spaced-apart prefilters, e.g., a 30% prefilter 20, a 60% prefilter 22, a 95% prefilter 24, a prefilter 26 with activated carbon, and a High Efficiency Particulate Air Filter (HEPA) 28. The term chamber as used herein is intended to encompass enclosed spaces of any volume from a "box" to a room or hall size. Also accommodated in the chamber A is a blower 30, sucking air from the outside into the chamber and out into a chamber B through outlet port 32. Chamber B accommodates a chemical detector 34, such as, a gas chromatograph (GC), a mass spectrometer (MS), an ionmobility spectrometer (IMS), an infrared spectroscope (IS) or the like gas analyzers. The chamber B is also furnished with valve means 36, which may be constituted by any device, even a door, for controlling the passage of air, which valve means is automatically operated by an actuator 38. Chamber C, sharing a common partition or wall 40 with chamber B, houses a plurality of filters 42 suitable for filtering chemical contamination of the air entering therein via pipes 44 leading from openings 46 in the wall 40. A plurality of suction blowers 48 assures smooth flow of air from chamber B via pipes 44 into the filters 42. Outlets from the filters 42 (not shown) are via several blowers into the chamber C and from there to chamber D. In chamber D there are located air-conditioning blowers 50 of building 2, and there is also distributed air outlets 52 of the backflow pipes exiting from the building 2.

Figure 4:
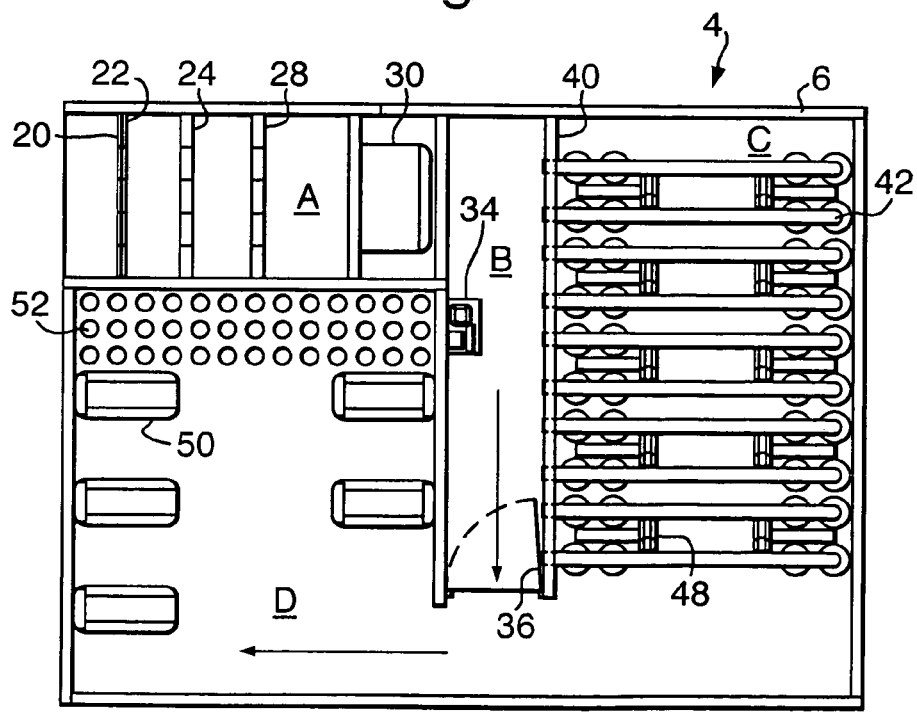

Referring to FIG. 4, there is illustrated a modification of the system 4 of FIGS. 2 and 3, in which there is not included a prefilter 26 with activated carbon. In this case, a partial chemistry removal is not provided and the "street chemistry" may trigger the chemical detector 34, causing the closing of the valve means 36. With the given "street chemistry", the valve means would then be closed very often and unnecessarily costly and wastefully activate the filters 42. The Figure also illustrates the air flow direction in the normal non-NBC alert mode, when the valve means 36 is open "short-circuiting" the filters 42, avoiding costly operation and maintenance.

Figure 5:
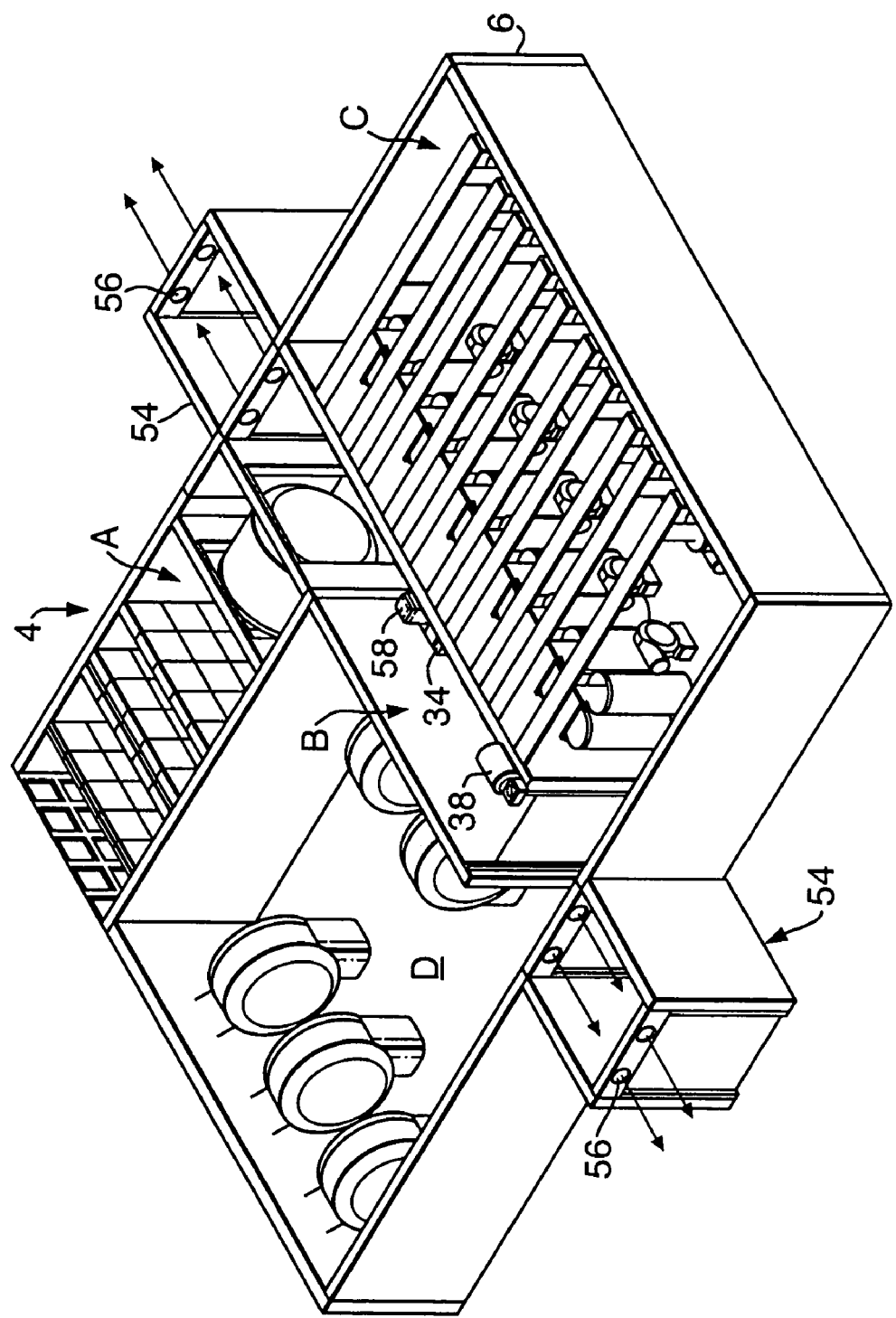

Turning now to FIG. 5, there is shown the system 4 fitted with two airlock units 54, mandatory for maintenance. Through these airlock units 54, maintenance staff can enter the system 4 even during alarm periods, without adversely affecting the filtration. The airlock units 54 are equipped with airflow regulation valves 56, assuring that no contaminated air enters the system with the maintenance staff.

As can be understood, during normal tranquil periods, namely, when there is no immediate danger of NBC attack, or during periods between attacks, the building's standard HVAC operates as required, so as the blower 30 in chamber A with the valve means 36 in chamber B open. Once the detector 34 detects hazardous chemicals in the airflow in chamber B, the detector 34 emits a signal which is transmitted by transmitter 58 to the actuator 38, which closes the valve means. Alternatively, once an alarm signal is activated by the transceiver 10 and transmitted to the detector 34, the latter activates the actuator 38, shuts it and activates the blowers of filters 42 to effect sucking of the air from chamber B through the filters. The filtered clean air is thus directed via chamber C and chamber D into the building. These filters can advantageously be designed to enhance the overpressure in the building. It is left to the user's discretion to decide which of the filters 20 to 28 to install at any given period, depending on prevailing per se understood circumstances.

While the above description refers mainly to filters protecting against chemicals, it should be understood that filters protecting against biological contaminants could be used in addition to the filters protecting against chemical hazards.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for economically controlling air purity within a protected space, said method comprising
providing a combined building air-conditioning unit and a NBC protection system having an enclosed space housing a building air-conditioning unit and further including a plurality of chambers; a first chamber having an ambient air inlet port, at least one prefilter and a blower; a second chamber having valve means receiving air from said blower and accommodating a C-detector and a valve means actuator responsive to, and at least indirectly, operable by said C-detector, and a third chamber housing at least one C-filter and a blower, said second chamber and said third chamber sharing at least a portion of a common wall;
sucking ambient air into said first chamber by said blower and activating said C-detector, and
causing the valve means of said second chamber to close and activate said C-filters and blowers upon detecting C-contamination by said C-detector.

2. A method for economically controlling air purity within a protected space, said method comprising
providing a combined building air-conditioning unit and a NBC protection system having an enclosed space housing a building air-conditioning unit and further including a plurality of chambers; a first chamber having an ambient air inlet port, at least one prefilter and a blower; a second chamber having valve means receiving air from said blower and accommodating a C-detector and a valve means actuator responsive to, and at least indirectly, operable by said C-detector, and a third chamber housing at least one C-filter and a blower, said second chamber and said third chamber share at least a portion of a common wall;
sucking ambient air into said first chamber by said blower and activating said C-detector, and
causing the valve means of said second chamber to close and activate said C-filters and blowers upon receiving a signal from an NBC attack warning station.

3. A combined building air-conditioning unit and NBC protection system, comprising:
an enclosed space housing a building air-conditioning unit and further including a plurality of chambers;
a first chamber having an ambient air inlet port, at least one prefilter and a blower for sucking air through said prefilter;
a second chamber having valve means having an open and closed state, receiving air from said blower and accommodating a C-detector and a valve means actuator, responsive, at least indirectly to, and operable by, said C-detector, and
a third chamber housing at least one C-filter and a blower for sucking air from said second chamber via said C-filter into the building when said valve means is in its closed state,
said second chamber and said third chamber sharing at least a portion of a common wall.

4. The system as claimed in claim 1, wherein said prefilter is a filter protecting against chemical contaminants.

5. The system as claimed in claim 1 further comprising at least one filter protecting against biological hazards installed in said first chamber.

6. The system as claimed in claim 1, wherein said C-detector is selected from the group of chemical analyzers including gas chromatographs (GC), mass spectrometers (MS), ionmobility spectrometers (IMS) and infrared spectrographs (IS).

7. The system as claimed in claim 1, further comprising a transmitter operationally coupled to said detector for transmitting a signal upon detecting a hazardous chemical.

8. The system as claimed in claim 7, wherein said actuator further comprises a receiver for receiving a signal transmitted by said detector transmitter and actuating the closing of said valve means.

9. The system as claimed in claim 7, wherein said detector activates the operation of said C-filter and blower upon detecting a hazardous chemical.

10. The system as claimed in claim 1, further comprising a transceiver for receiving a warning signal against a possible NBC attack and transmitting a warning signal to said valve means actuator and C-filter and blower.

11. The system as claimed in claim 10, wherein said actuator closes the valve means and said C-filter and blower are activated upon receiving a signal from said transceiver.

12. The system as claimed in claim 1, wherein said C-filter and blower are operable to enhance overpressure inside said building.

13. A combined building air-conditioning unit and NBC protection system, comprising:
an enclosed space housing a building air-conditioning unit and further including a plurality of chambers;
a first chamber having an ambient air inlet port, at least one prefilter and a blower for sucking air through said prefilter;
a second chamber having valve means having an open and closed state, receiving air from said blower and accommodating a C-detector and a valve means actuator, responsive, at least indirectly to, and operable by, said C-detector, and
a third chamber housing at least one C-filter and a blower for sucking air from said second chamber via said C-filter into the building when said valve means is in its closed state,
at least one airlock unit communicating with any one of said chambers, facilitating entering the system during its operation, without the danger of contamination.

14. The system as claimed in claim 13, wherein said prefilter is a filter protecting against chemical contaminants.

15. The system as claimed in claim 13, further comprising at least one filter protecting against biological hazards installed in said first chamber.

16. The system as claimed in claim 13, further comprising a transmitter operationally coupled to said detector for transmitting a signal upon detecting a hazardous chemical.

17. The system as claimed in claim 13, wherein said C-detector is selected from the group of chemical analyzers including gas chromatographs (GC), mass spectrometers (MS), ionmobility spectrometers (IMS) and infrared spectrographs (IS).

18. The system as claimed in claim 17, wherein said actuator further comprises a receiver for receiving a signal transmitted by said detector transmitter and actuating the closing of said valve means.

19. The system as claimed in claim 17, wherein said detector activates the operation of said C-filter and blower upon detecting a hazardous chemical.

20. The system as claimed in claim 13, further comprising a transceiver for receiving a warning signal against a possible NBC attack and transmitting a warning signal to said valve means actuator and C-filter and blower.

21. The system as claimed in claim 20, wherein said actuator closes the valve means and said C-filter and blower are activated upon receiving a signal from said transceiver.

22. The system as claimed in claim 13, wherein said C-filter and blower are operable to enhance overpressure inside said building.

23. The system as claimed in claim 13, wherein said second chamber and said third chamber share at least a portion of a common wall.

\* \* \* \* \*